US011784775B2

(12) United States Patent
Baron et al.

(10) Patent No.: US 11,784,775 B2
(45) Date of Patent: Oct. 10, 2023

(54) ACKNOWLEDGEMENT OF DIRECT LINK AND DOWNLINK TRANSMISSIONS IN TRIGGER-BASED MULTI-USER TRANSMISSIONS

(71) Applicant: CANON KABUSHIKI KAISHA, Tokyo (JP)

(72) Inventors: Stéphane Baron, Le Rheu (FR); Patrice Nezou, Liffre (FR); Pascal Viger, Janze (FR); Julien Sevin, Saint Aubin du Cormier (FR)

(73) Assignee: Canon Kabushiki Kaisha, Tokyo (JP)

( * ) Notice: Subject to any disclaimer, the term of this patent is extended or adjusted under 35 U.S.C. 154(b) by 28 days.

(21) Appl. No.: 17/258,346

(22) PCT Filed: Jul. 5, 2019

(86) PCT No.: PCT/EP2019/068140
§ 371 (c)(1),
(2) Date: Jan. 6, 2021

(87) PCT Pub. No.: WO2020/011677
PCT Pub. Date: Jan. 16, 2020

(65) Prior Publication Data

US 2021/0273768 A1 Sep. 2, 2021

(30) Foreign Application Priority Data

Jul. 11, 2018 (GB) ...................................... 1811379

(51) Int. Cl.
*H04L 5/00* (2006.01)
*H04W 72/0446* (2023.01)
(Continued)

(52) U.S. Cl.
CPC ....... *H04L 5/0055* (2013.01); *H04W 72/0446* (2013.01); *H04W 72/0453* (2013.01); *H04W 72/23* (2023.01); *H04W 84/12* (2013.01)

(58) Field of Classification Search
CPC .............. H04L 5/0055; H04W 72/042; H04W 72/0446; H04W 72/0453; H04W 84/12; H04W 74/08
See application file for complete search history.

(56) References Cited

U.S. PATENT DOCUMENTS

2015/0004901 A1* 1/2015 Agiwal ................. H04W 76/14 455/39
2017/0265135 A1 9/2017 Cariou et al.
2019/0281656 A1* 9/2019 Wu ....................... H04L 5/0039

FOREIGN PATENT DOCUMENTS

EP 3261403 A1 12/2017

OTHER PUBLICATIONS

Abhishek Patil, et al. "CIDs in 27.5.2", IEEE Draft; 11-17-0249-02-00AX-CIDS-IN-5-2, IEEE-SA Mentor, XP068115239, vol. 802. 11ax, No. 2, May 2017, pp. 1-18 (Retrieved from Internet on May 5, 2017; URL: https://mentor.ieee.org/802.11/dcn/17/11-17-0249-02-00ax-cids-in-27-5-2.docx).

* cited by examiner

*Primary Examiner* — Dady Chery
(74) *Attorney, Agent, or Firm* — Canon U.S.A., Inc. IP Division

(57) ABSTRACT

Aspects of the present disclosure generally relate to enhanced multi-user (MU) uplink (UL) protocols in wireless networks that allow non-UL transmissions to be performed simultaneously with triggered MU UL transmissions. A station may send a trigger frame triggering MU transmissions with an appropriate signaling to allow non-UL transmissions, i.e. transmission to another station, in a resource
(Continued)

unit of the MU transmission. Examples of non-UL transmissions include Direct Link transmissions as well as downlink (DL) transmissions. The present disclosure regards how acknowledgment of or response to such transmissions can be efficiently performed. A response resource unit to be used within a MU transmission by the DiL/DL destination station to send a response to the (DiL/DL) data transmission may be signaled in the trigger frame triggering the DiL/DL transmissions in appropriate resource units.

18 Claims, 9 Drawing Sheets

(51) Int. Cl.

| | |
|---|---|
| ***H04W 72/0453*** | (2023.01) |
| ***H04W 72/23*** | (2023.01) |
| *H04W 84/12* | (2009.01) |

ACKNOWLEDGEMENT OF DIRECT LINK AND DOWNLINK TRANSMISSIONS IN TRIGGER-BASED MULTI-USER TRANSMISSIONS

CROSS REFERENCE TO RELATED APPLICATION

This application claims the benefit under 35 U.S.C. § 119(a)-(d) of United Kingdom Patent Application No. 1811379.5, filed on Jul. 11, 2018 and entitled "ACKNOWLEDGMENT OF DIRECT LINK AND DOWNLINK TRANSMISSIONS IN TRIGGER-BASED MULTI-USER TRANSMISSIONS". The above cited patent application is incorporated herein by reference in its entirety.

FIELD OF THE INVENTION

The present invention generally relates to wireless communications.

BACKGROUND OF THE INVENTION

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth and decreasing latency requirements that are demanded for wireless communications systems in high-density environments, multi-user (MU) schemes are being developed to allow a single access point (AP) to schedule MU transmissions, i.e. multiple simultaneous transmissions to or from non-AP stations, in the wireless network. For example, one of such MU schemes has been adopted by the Institute of Electrical and Electronics Engineers (IEEE) in the 802.11ax standard, draft version 3.0 (D3.0) of June 2018.

Thanks to the MU feature, a station has the opportunity to gain access to the wireless medium via two access schemes: the MU scheme and the conventional Enhanced Distributed Channel Access—EDCA (Single User) scheme.

The 802.11ax standard allows a MU downlink (DL) transmission to be performed by the AP where the latter can perform multiple simultaneous elementary transmissions, over so-called resource unit (RU), to various non-AP stations. As an example, the resource units split a communication channel of the wireless network in the frequency domain, based for instance on Orthogonal Frequency Division Multiple Access (OFDMA) technique.

The 802.11ax standard also allows a MU uplink (UL) transmission to be triggered by the AP, where various non-AP stations can simultaneously transmit to the AP over the resource units forming the MU UL transmission. To control the MU UL transmission by the non-AP stations, the AP sends a control frame, known as a Trigger Frame (TF), by which it allocates the resource units to the non-AP stations using 16-bit Association IDentifiers (AIDs) assigned to them upon registration to the AP and/or using reserved AIDs designating a group of non-AP stations.

The adopted 802.11ax MU transmission scheme is not adapted to bandwidth-demanding communication services, e.g. video-based services such as gaming, virtual reality, streaming applications. This is because all the communications go through the AP, thereby doubling the air time for transmission but also the number of medium accesses (and thus of medium access time).

The Single User (SU) scheme of 802.11 network protocol (still applicable in the latest 802.11ax version) allows a direct link (DiL) to be performed wherein the data (MAC) frames are addressed using the 48-bit IEEE MAC address of the destination station. However, SU and MU schemes directly compete one against the other to gain access to the wireless medium (by the AP for MU schemes, by a non-AP station for the SU scheme). In high density environments, this competition generates a large amount of undesirable collisions, thereby degrading latency and overall useful data throughput.

More generally, 802.11 ax is seen as not being adapted to direct link transmissions and MU transmissions can be improved.

SUMMARY OF INVENTION

It is a broad objective of the present invention to improve this situation.

In order to take advantage of the high benefits of the transmission scheduling made by the AP in high density environments, the inventors have contemplated integrating the direct link in the global policy of the AP's scheduling. This raises some challenges.

One of these challenges relates to how perform efficient acknowledgment of direct link (DiL) transmissions when these direct link transmissions are integrated within the 802.11ax MU schemes. More generally, aspects of the present disclosure relate to how efficiently manage the transmission of data by a non-AP station in response to data received during a triggered-based MU transmission.

Certain aspects of the present disclosure provide a method for wireless communication comprising, at a triggering station, usually an access point, AP:

generating a trigger frame to trigger a multi-user, MU, transmission, wherein the trigger frame allocates a first resource unit of the MU transmission for data transmission towards a destination triggered station, usually non-AP stations, and sending the trigger frame to the destination triggered station, wherein the trigger frame signals a response resource unit of a MU transmission to be used by the destination triggered station to send a response to the data transmission.

Preferred implementation is when the triggering station is an AP and the triggered stations are non-AP stations (stations having registered to the AP).

In that way, the triggering station can allow the destination triggered station to acknowledge (or respond to) the received data in a resource unit of MU transmission, thereby avoiding the destination triggered station to access by its own (i.e. through conventional EDCA contention) to the medium.

In addition, by providing the signaling in the trigger frame itself, both the destination triggered station and the station sending the data have knowledge of the same information regarding the response resource unit. The sending station may thus receive the acknowledgment (or any response data). An efficient acknowledgment mechanism is thus provided.

From destination station perspective, these aspects of the invention provide a method for wireless communication comprising, at a triggered station, usually a non-access-point station:

receiving, from a triggering station, usually an access point, AP, a trigger frame triggering a multi-user, MU, transmission, wherein the trigger frame allocates a first resource unit of the MU transmission for data transmission towards the triggered station, wherein the trigger frame signals a response resource unit of a MU transmission to be used by the triggered station to send a response to the data transmission, and responsive to receiving a data frame over the first resource unit, sending response data over the response resource unit.

From source station perspective (sending the data to acknowledge for instance), these aspects of the invention provide a method for wireless communication comprising, at a triggered station, usually a non-access-point station:

receiving, from a triggering station, usually an access point, AP, a trigger frame triggering a multi-user, MU, transmission, wherein the trigger frame allocates a first resource unit of the MU transmission for direct link, DiL, transmission towards a destination triggered station, wherein the trigger frame signals a response resource unit of a MU transmission to be used by the destination triggered station to send a response to the DiL transmission, sending a data frame directly to the destination triggered station using the first resource unit, and receiving response data to the data frame over the response resource unit.

Aspects of the invention also provide a station in a wireless network comprising a microprocessor configured for carrying out the steps of the method defined above.

Optional features of the invention are defined in the appended claims. Some of these features are explained here below with reference to a method, while they can be transposed into system features dedicated to any system according to the invention.

In embodiments, the first resource unit and the response resource unit belong to the same transmission opportunity granted to the triggering station through (EDCA) contention. This prevents the AP from having to access the medium twice, thereby reducing latency and collisions.

In particular, the first resource unit and the response resource unit may belong to MU transmissions triggered by the same trigger frame. This approach advantageously reduces signaling costs (no need to transmit two trigger frames that are quite long).

In some embodiments, the triggered station sends, over the response resource unit, a data frame additional to the response data. This approach increases throughput for the triggered station, thereby offering a more efficient wireless network.

In other embodiments, the first resource unit and the response resource unit have the same RU position within a frequency band. The RU positions of the resource RUs thus do not need to be signaled, thereby saving bits In some embodiments, the trigger frame allocates other resource units of the MU transmission for uplink transmissions to the triggering station and corresponding uplink-related response resource units for the triggering station to send responses to the uplink transmissions, wherein the signaling of the response resource units groups the uplink-related response resource units over adjacent resource units. This approach advantageously limits the number of required antenna at the AP, or the quality of the radio filter dedicated to isolate the frequency band to use. It also allows the AP to use the Multi Station block ack (M-STA BA) format as described in the 802.11ax amendment.

In some embodiments, the response resource unit is signaled, in the trigger frame, in a User Info field associated with the first resource unit according to 802.11ax D3.0 (802.11ax Draft 3.0). This approach advantageously does not require changes to the 802.11 signaling.

In a particular embodiment, the signaling includes a dedicated subfield in a Trigger Dependent User Info subfield of the User Info field according to 802.11ax D3.0. The dedicated subfield is preferably added at the end of the Trigger Dependent User Info subfield.

In some embodiments, the dedicated subfield comprises a HE TB PPDU length field and a RU allocation field (according to 802.11 ax D3.0) respectively defining a length of the response resource unit and a position of the response resource unit within a frequency band of the MU transmission. This approach proposes a shortened version of 802.11ax TRS A-Control subfield where useless information (because the AP is no longer concerned) is omitted. It thus advantageously relies on formats already known (for other purposes).

In a variant, the dedicated subfield comprises only a HE TB PPDU length field according to 802.11ax D3.0 defining a length of the response resource unit. This approach saves more bits as the positions for response RUs are not encoded. The approach may rely on an implicit positioning of these RUs, for instance at the same position as the first RU.

In particular embodiments, the response resource unit is jointly signaled by the dedicated subfield and a binary (preferably one bit) flag indicating the presence of the dedicated subfield. For instance, it may be bit B39 of User Info field or bit B5 of the basic Trigger Dependent User Info subfield. This approach allows retro compatibility with existing 802.11 devices.

In some embodiments, the response data are an acknowledgment of the data or DiL transmission.

In other embodiments related to DL, the first resource unit is allocated for downlink (DL) transmission from the triggering station to the destination triggered station, and the method further comprises, at the triggering station:

sending a data frame to the destination triggered station using the first resource unit allocated for downlink (DL) transmission, and receiving response data to the data frame over the response resource unit.

This provides DL capabilities in triggered MU transmission with efficient acknowledgment.

Another aspect of the invention relates to a non-transitory computer-readable medium storing a program which, when executed by a microprocessor or computer system in a device, causes the device to perform any method as defined above.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF EMBODIMENTS

Figure 1:
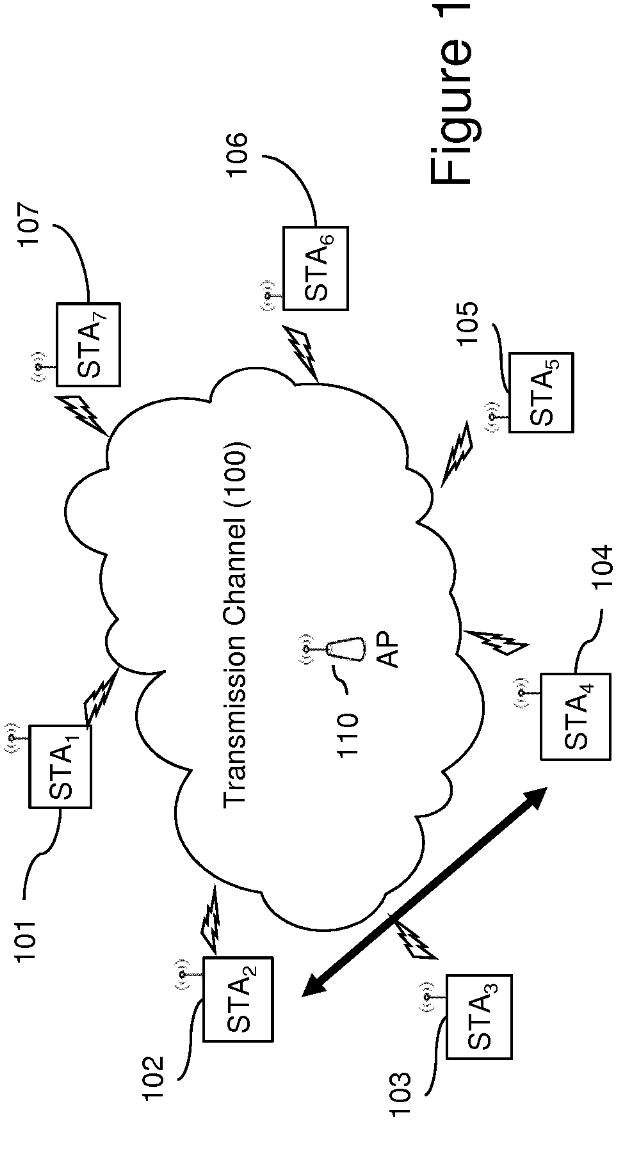
FIG. 1 illustrates a typical wireless communication system in which embodiments of the invention may be implemented.

Aspects of the present disclosure generally relate to enhanced multi-user (MU) uplink (UL) protocols in wireless networks that allow non-UL transmissions to be performed simultaneously with triggered MU UL transmissions. As will be described in more detail herein, a station may send a trigger frame triggering MU transmissions with an appropriate signaling to allow non-UL transmissions, i.e. transmission to another station, in a resource unit of the MU transmission. Examples of non-UL transmissions include Direct Link transmissions as well as downlink (DL) transmissions. The present disclosure regards how acknowledgment of or response to such transmissions can be efficiently performed.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple user terminals. A TDMA system may allow multiple user terminals to share the same frequency channel by dividing the transmission signal into different time slots or resource units, each time slot being assigned to different user terminal. An OFDMA system utilizes orthogonal frequency division multiplexing (OFDM), which is a modulation technique that partitions the overall system bandwidth into multiple orthogonal sub-carriers or resource units. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers.

The teachings herein may be incorporated into (e.g., implemented within or performed by) a variety of apparatuses (e.g., stations). In some aspects, a wireless station implemented in accordance with the teachings herein may comprise an access point (so-called AP) or not (so-called non-AP station).

An AP may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A non-AP station may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, a non-AP station may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the non-AP station may be a wireless node. Such wireless node may provide, for example, connectivity for or to a network (e.g., a wide area network such as the Internet or a cellular network) via a wired or wireless communication link.

FIG. 1 illustrates a wireless communication system in which several communication stations 101-107, 110 exchange data frames over a radio transmission channel 100 of a wireless local area network (WLAN), under the management of a central station, namely access point (AP) 110 with which the stations have registered. In a variant, direct communications between stations can be implemented without the use of an access point (known as an Ad-hoc mode). The radio transmission channel 100 is defined by an operating frequency band constituted by a single channel or a plurality of channels forming a composite channel.

An exemplary wireless network is the 802.11 network according to 802.11ax D3.0 standard (published in June 2018).

Each non-AP station 101-107 registers to the AP 110 during an association procedure. During the well-known association procedure, the AP 110 assigns a specific Association IDentifier (AID) to the requesting non-AP station. An AID is a 16-bit value uniquely identifying the non-AP station. According to IEEE standard, the value of an AID is assigned in the range 1 to 2007 for Directional multi-gigabit non-AP station; the 5 MSBs of the AID are reserved.

All the stations 101-107, 110 compete one against each other using EDCA (Enhanced Distributed Channel Access) contention, to access the wireless medium in order to be granted a transmission opportunity (TXOP) and then transmit data frames.

To increase wireless network efficiency, multi-user (MU) schemes are available to allow a single station, usually the AP 110, to schedule MU transmissions, i.e. multiple simultaneous transmissions to or from other stations, in the wireless network. Such a MU scheme has been adopted in 802.11ax, as the Multi-User Uplink and Downlink OFDMA (MU UL and DL OFDMA) procedures.

Figure 2A:
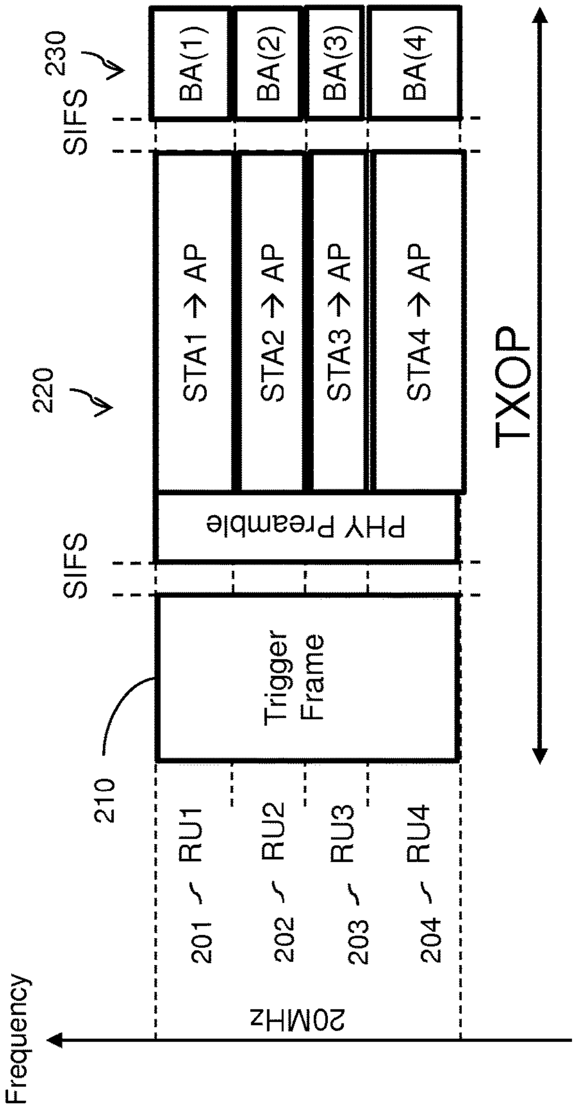
FIGS. 2*a* and 2*b* illustrate a conventional trigger-based (TB) MU UL OFDMA transmission with acknowledgment according to 802.11ax.

With reference to FIG. 2*a*, to actually perform such MU UL transmission, the 802.11ax standard splits a granted communication channel into resource units 201-204 (RUs) that are shared in the frequency domain by the multiple stations, based on Orthogonal Frequency Division Multiple Access (OFDMA) technique.

To finely control the MU UL transmissions by the non-AP stations 101-107, the AP 110 sends a trigger frame 210 which defines how the channel is split into RUs and which non-AP station is allowed to transmit over each RU. In this example, trigger frame 210 assigns RU 201 to STA1, RU 202 to STA2, RU 2013 to STA3 and RU 204 to STA4. The assignment is made using the AIDs of the non-AP stations.

Upon reception of trigger frame 210, each non-AP station determines its assigned RU thanks to its own AID and can start transmit MU frames 220 (known as HE TB PPDU) over its assigned RU to the AP after a SIFS period after trigger frame 210.

Due to the triggering mechanism, the terms "trigger-based MU UL transmission" are used.

After the parallel transmission of the four HE TB PPDUs by stations STA2 to STA4, AP 110 sends individual block ack (BA) 230 over each RU or a multi-station (M-STA) block ack (BA) 230 over the whole band as described in 802.11 ax D3.0.

Figure 2B:
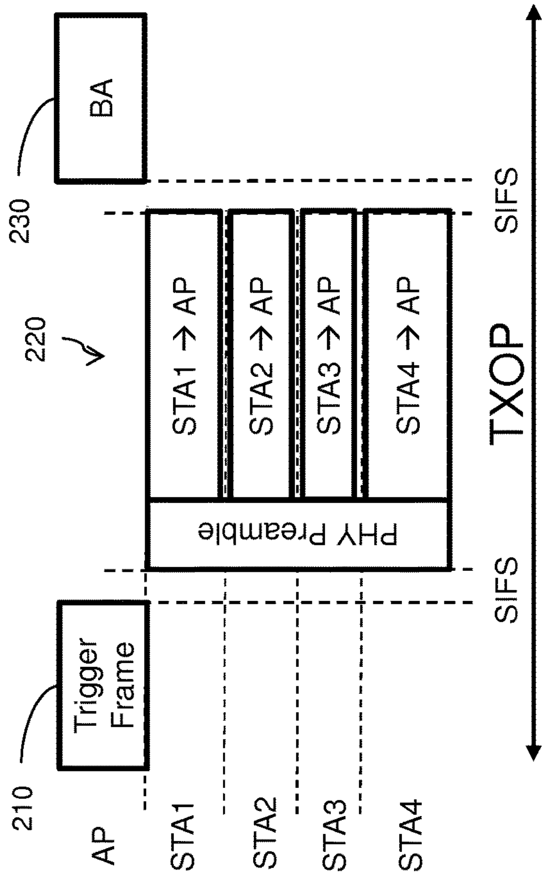

FIG. 2*b* illustrates the same MU UL transmission from station perspective.

Figure 3A:
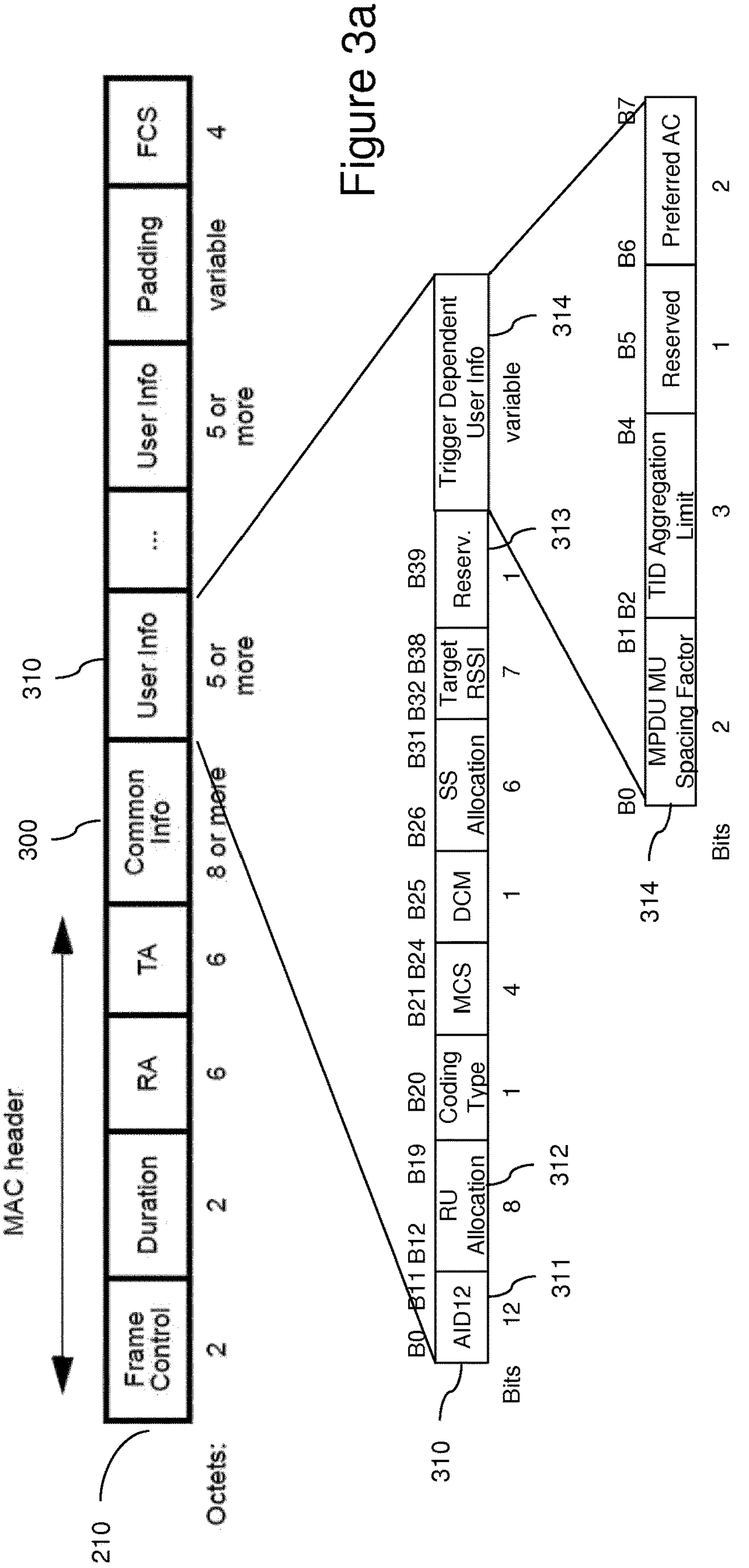
FIG. 3*a* illustrates the format of a trigger frame as described in section 9.3.1.23 of the 802.11 ax standard to perform MU UL OFDMA transmissions.

FIG. 3*a* illustrates the format of a trigger frame as described in section 9.3.1.23 of the 802.11 ax standard to perform MU UL OFDMA transmissions.

The trigger frame 210 contains several fields as defined in the IEEE standard 802.11ax and in particular it includes a single Common Info field 300 and a plurality of User Info fields 310.

Each User Info field 310 defines the assignment of the RUs defined in the Common Info field 300 to respective non-AP stations 101-107, as well as communication parameters to respect for UL communication with the AP. To do so, RU Allocation subfield 312 identifies the RU concerned (central frequency and frequency bandwidth), while AID12 subfield 311 carries the 12 LSBs of the AID of the non-AP station for which the RU is assigned.

Bit B39 313 of User Info field 310 is currently not used. Trigger Dependent User info subfield 314 is mainly used to provide details on communication parameters defined by the other subfields of the User Info field 310. The content of Trigger Dependent User info subfield 314 depends on the type of trigger frame. The format shown in the Figure corresponds to Trigger Dependent User info subfield 314 of a basic trigger frame.

The User Info field as defined in 802.11ax thus clearly authorizes only UL transmissions as only the source non-AP station is identified in AID12 subfield 311.

Figure 2C:
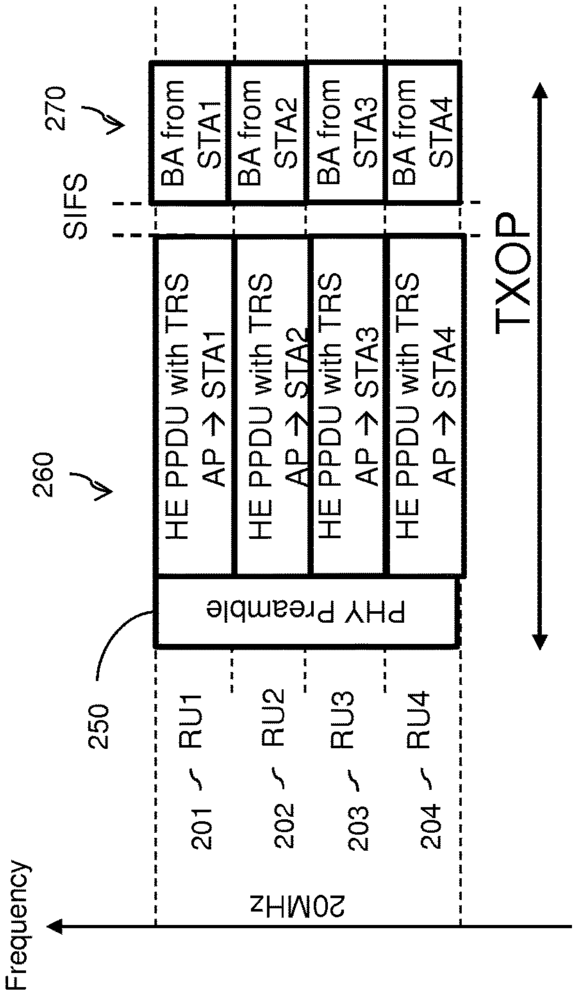
FIGS. 2*c* and 2*d* illustrate a conventional MU DL OFDMA transmission with acknowledgment according to 802.11ax.

FIG. 2*c* illustrates a MU DL transmission in the frequency domain where AP 110 sends data frames (HE PPDUs). As for MU UL transmission, the 802.11ax standard splits a granted communication channel into resource units 201-204 (RUs) that are shared in the frequency domain by the multiple stations, based on Orthogonal Frequency Division Multiple Access (OFDMA) technique.

In the example of the Figure, AP 110 defines four RUs to communicate with the four non-AP stations. Preamble 250 contains a description of the RUs and an ordered list of stations that will be the destination non-AP stations for the DL transmissions over each of the RUs 201-204.

Next, AP 110 transmits its data within data frames (HE PPDUs) to the stations: to STA1 over RU1 201, to STA2 over RU2 202, to STA3 over RU3 203 and to STA4 over RU4 204.

In addition to the data themselves, AP 110 can include a TRS control subfield in the A-Control field of each HE PPDU sent to the non-AP stations. This TRS subfield contains all indication needed by a destination non-AP station (STA1-STA4) to acknowledge the received data in the next MU UL transmission (without having to EDCA access the medium), which is for instance triggered after a SIFS (Short Inter Frame Space) after the MU DL transmission 260.

Figure 3B:
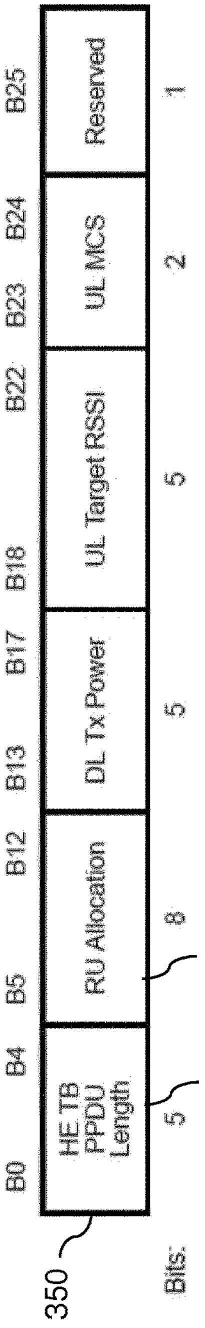
FIG. 3*b* illustrates the format of a TRS field used in MU DL OFDMA transmission to signal RUs for acknowledgment.

As shown in FIG. 3*b*, subfield TRS 350 according to 802.11ax includes a length 351 of the future MU UL packet and the allocation 352 of the RU to use for the destination non-AP station to acknowledge the data received. The other parameters of TRS subfield 350 are used to indicate the modulation (MCS) and transmission power (based on the expected RSSI at AP side) to be used for the AP to efficiently receive the acknowledgments.

Back to FIG. 2*c*, AP 110 then sends its data frames (PPDUs) 260 to the non-AP stations using the RUs.

The non-AP stations can decode the PPDU 260 received from the AP, including decoding the content of the TRS subfield 350 of the received PPDU.

The non-AP stations then prepare their block ack (BA) packets 270.

After SIFS (Short Inter Frame Space) after the end of the reception of the PPDU, each non-AP station sends its prepared BA packet 270 over the RU specified in field 352 of received TRS subfield 350.

Figure 2D:
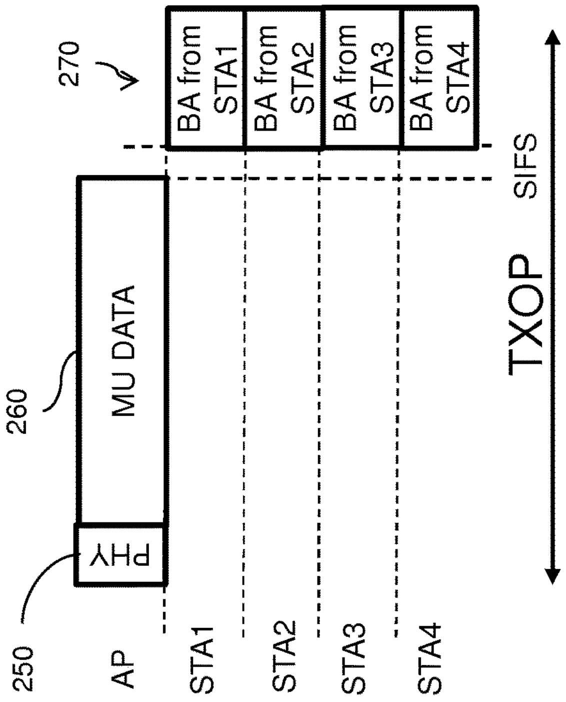

FIG. 2*d* illustrates the same MU DL transmission from station perspective.

In order to further address the issue of increasing bandwidth and decreasing latency requirements that are demanded for wireless communications systems in high-density environments, aspects of the invention seek to efficiently vary the transmissions allowed in a triggered MU transmission. Aspects of the invention provide features allowing Direct Link (DiL) transmissions and/or Downlink (DL) transmissions to be scheduled in a MU transmission by using an enhanced trigger frame. To that end, the trigger frame sent by the triggering station (usually an AP) to other triggered stations (usually non-AP stations) is enhanced into a trigger frame allocating a resource unit of the MU transmission for data transmission towards one of the other triggered station, usually a destination non-AP station.

A station receiving the trigger frame is referred to as triggered station, while the station sending the trigger frame is referred to as triggering station.

The newly proposed trigger frame offers Direct Link (DiL) and/or Downlink (DL) transmission capabilities within the triggered MU transmission, in addition to Uplink (UL) capabilities.

An uplink MU transmission is defined as a MU transmission from a non-AP station to the AP.

A Downlink MU transmission is defined as a MU transmission from the AP to one or more (non-AP) stations.

A Direct Link (DiL) MU transmission is defined as a MU transmission from one non-AP station to one or more other non-AP stations.

Although the triggering station may be any of stations 101-107, 110, the examples provided below mainly concentrate on the AP 110 as being the triggering station and non-AP stations 101-107 as being the triggered stations. Of course other configurations may be implemented where the AP is a triggered station and one non-AP station is the triggering station. Another configuration may comprise a first AP as the triggering station and a second AP as one of the triggered stations (this remote AP acting as a non-AP station with regards to the present Trigger Frame).

As will be described in more detail herein, a triggered station may then send a data frame directly to the destination triggered station using the resource unit allocated, by the trigger frame, for direct link transmission towards that destination triggered station. This implements the Direct Link (DiL) capability offered during the triggered MU transmission, from a DiL source triggered station perspective.

Also, another triggered station may then receive a data frame over the resource unit allocated for data transmission towards the triggered station. This implements the Direct Link capability from DiL destination station perspective or the Downlink capability when the data frame come from the triggering station.

Below, DiL RU refers to a resource unit so allocated for Direct Link transmission; DL RU refers to a resource unit allocated for Downlink transmission; and DiL/DL RU refers to a resource unit allocated for Direct Link or Downlink transmission.

Figure 4:
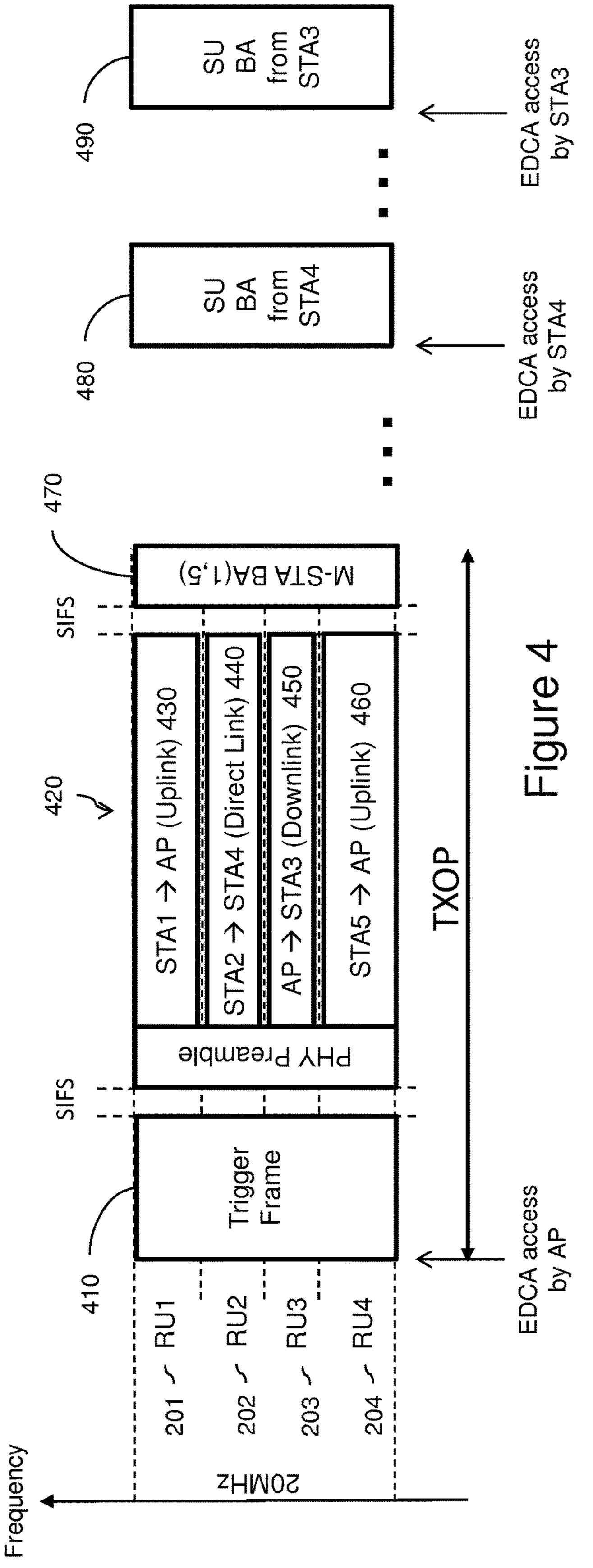
FIG. 4 illustrates a trigger-based (TB) Multi-User (MU) transmission that includes, in addition to conventional MU UL transmissions to the triggering station, MU transmissions directed to triggered stations.

FIG. 4 illustrates a trigger-based (TB) Multi-User (MU) transmission that includes, in addition to conventional MU UL transmissions to the triggering station (the AP), MU transmissions directed to triggered stations (one or more non-AP stations).

In this example, the MU transmission 420 triggered by trigger frame 410 contains conventional uplink MU frames 430, 460 over RU 201 (from non-AP STA1 to AP 110) and RU 204 (from non-AP STA5 to AP 110), downlink (DL) MU frames 450 over DL RU 203 (from AP 110 to non-AP STA3) and Direct Link (DiL) MU frames 440 over DiL RU 202 (from non-AP STA 2 to non-AP STA 4). More generally, the number of DL RUs may vary, as well as the number of DiL RUs. In embodiments, there may be only DL RUs in addition to conventional UL MU RUs or only DiL RUs in addition to conventional UL MU RUs.

Trigger frame 410 conveys the signaling of such DiL/DL MU resource units. Then, upon reception of the trigger frame, the triggered stations (here non-AP stations) are able to determine whether they are allocated a resource unit for DiL or DL transmission, and in the affirmative which resource unit either to transmit or to receive.

Various implementations of the signaling of DiL or DL RUs may be used. For instance, the DiL/DL purpose and the source and destination AIDs may be encoded, within a User Info field 310 corresponding to a given RU, using one or more of AID12 subfield 311, reserved bit B39 313 and Trigger Dependent User Info subfield 314.

After the parallel transmission of the four data frames 420, AP 110 sends a multi-station (M-STA) block ack (BA) 470 as described in 802.11 ax D3.0 to acknowledge reception of data from STA1 and STA5.

STA3 and STA4 then wait for a next transmission opportunity they can obtain using conventional EDCA medium access mechanism. Upon accessing the medium (one station after the other), each of them sends an Acknowledgement frame 480, 490 (Ack or Block Ack frame) using the whole operating band (in the example shown: 20 MHz). In that way, STA3 acknowledge the data received from AP 110 (DL transmission), while STA4 acknowledges the data received from STA2 through DiL.

STA3 and STA4 are forced to wait for a new transmission opportunity (TXOP). They cannot use the resource units during M-STA BA 470, in particular because they are not aware of the length of M-STA BA transmission by AP 110. Due to the new TXOPs required for STA3 and STA4, the efficiency of the wireless network is decreased.

In order to address this issue, aspects of the invention seek to improve the acknowledgment of DiL and DL transmission by allowing such acknowledgment (or any response to DiL/DL transmission) within a triggered MU transmission (usually a MU UL transmission triggered by a trigger frame). This is achieved by signaling, in the trigger frame, response resource units of a MU transmission to be used by the destination triggered stations (STA3 and STA4 in the example of FIG. 4) to send a response to the (DiL/DL) data transmission.

Figure 5:
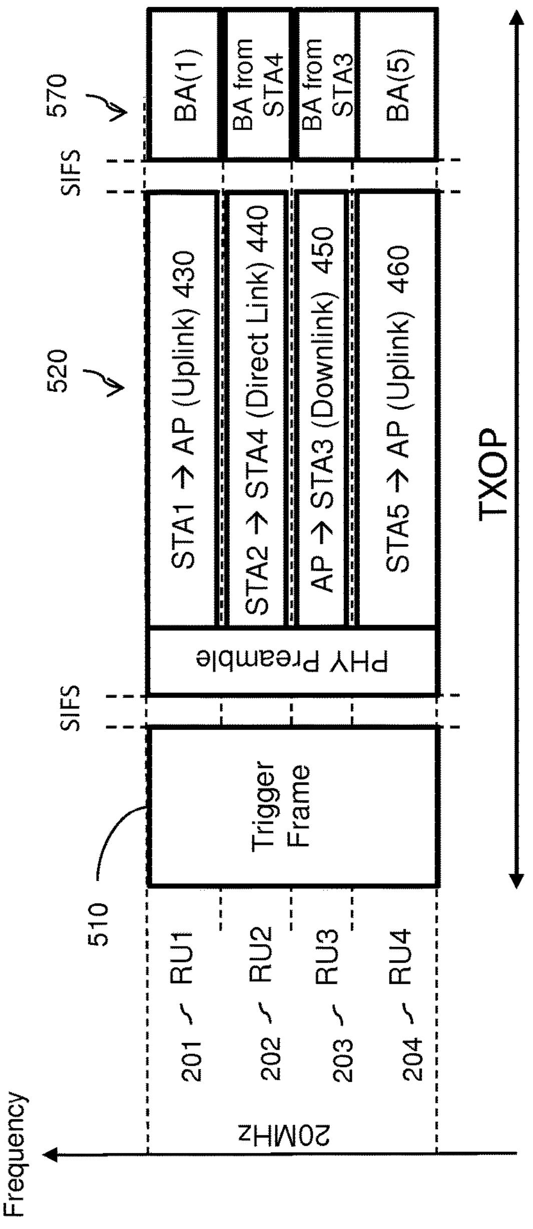
FIG. 5 illustrates a trigger-based (TB) Multi-User (MU) transmission as in FIG. 4, enhanced with acknowledgments by triggered stations in a MU transmission.

FIG. 5 illustrates the same trigger-based (TB) Multi-User (MU) transmission as in FIG. 4 including an exemplary signalling of response resource units to improve acknowledgment by the destination stations of DiL/DL transmissions.

AP 110 sends trigger frame 510 to reserve the different RUs, including RU2 for DiL transmission and RU3 for DL transmission. It also signals, in trigger frame 510, what will be the next MU transmission structure 570 and the RU allocation within it. It means AP 110 allocates the response RU (from the RU forming this next MU transmission) to the destination stations of DiL/DL transmissions in order for them to send their response (e.g. block Ack, response frames, etc.).

The MU transmission 520 is similar to MU transmission 420 described above.

By decoding the signalling from trigger frame 510, the destination non-AP stations can acknowledge the data received, directly in the MU transmission, here simultaneously with the acknowledgments from AP 110 for MU UL transmissions.

In the example shown, upon receiving data frames from STA2 over RU2, STA4 can send its acknowledgment over RU2 during MU transmission 570 (also referred below as response MU transmission). Similarly, upon receiving data frames from AP 110 over RU3, STA3 can send its acknowledgment over RU3 during MU transmission 570. In this example, the resource unit used for DiL/DL transmission and the corresponding response resource unit (for acknowledgment/response) have the same RU position within a frequency band. This advantageously allows not indicating the position of the response RU in the frequency band, thereby saving bits.

Also, in this example, the resource unit used for DiL/DL transmission and the corresponding response resource unit (for acknowledgment/response) belong to the same transmission opportunity granted to AP 110 through (EDCA) contention. This prevents the AP from having to access the medium twice, thereby reducing latency and collisions Of course, in a variant, the signaling may declare the response RUs in a future MU transmission of another TXOP.

More precisely, the resource unit used for DiL/DL transmission and the corresponding response resource unit (for acknowledgment/response) in the example belong to MU transmissions 520, 570 triggered by the same trigger frame 510. This approach advantageously reduces signaling costs (no need to transmit two trigger frames that are quite long). Of course, in a variant, AP 110 may send several trigger frames to offer separately-triggered MU transmissions within the same TXOP and signal the response resource unit from one triggered MU transmission to another separately-triggered MU transmission.

Aspects of the invention provides the response RU signaling by adding a dedicated field 600 in transmitted trigger frame 510.

Figure 6:
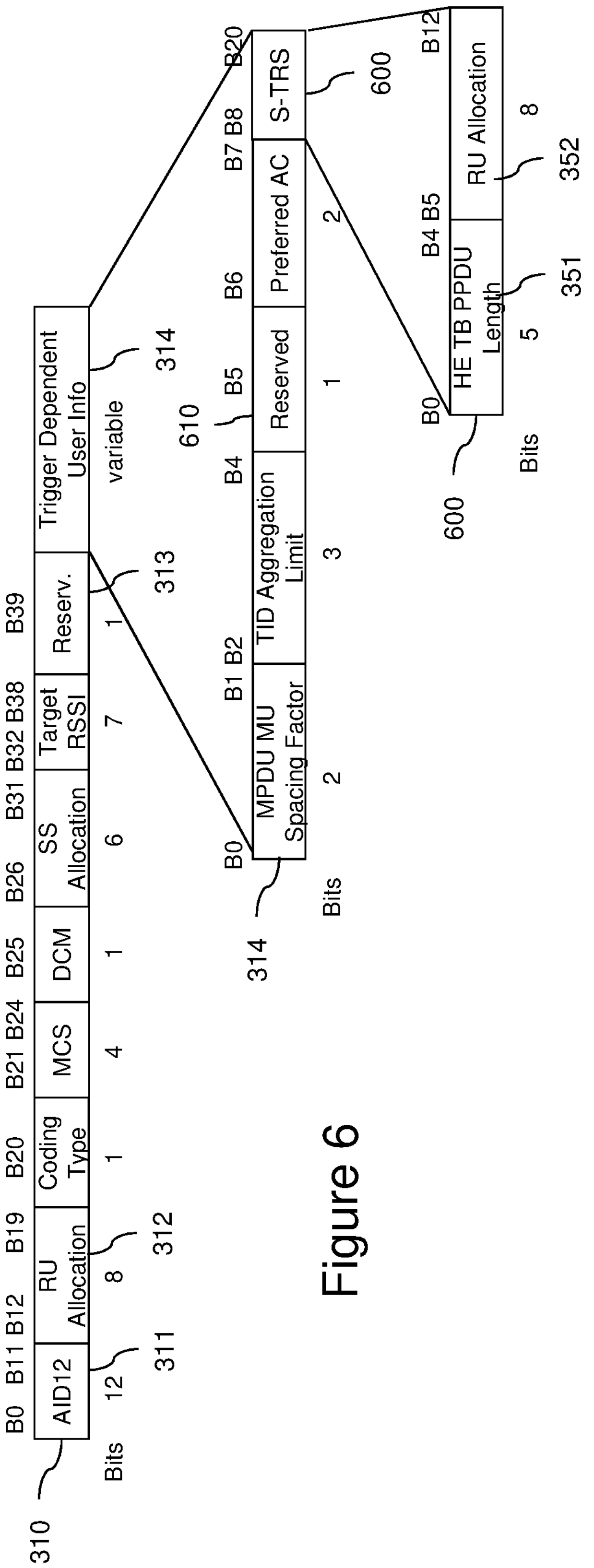
FIG. 6 illustrates an exemplary signaling of a S-TRS field as proposed to signal the response RUs for acknowledgments by triggered stations in a MU transmission.

An exemplary response RU signalling is shown in FIG. 6. This example is provided based on the Trigger Dependant Info subfield 314 of a basic trigger frame. However, the dedicated field 600 may also be provided with other examples of Trigger Dependant Info subfield 314, i.e. in the case of other types of trigger frames, including future versions of the Trigger Dependant Info subfield.

This example shows the response resource unit is signaled, in trigger frame 510, in a User Info field 310 associated with the DiL/DL resource unit used.

In particular, the dedicated field 600 is provided in a Trigger Dependent User Info subfield 314 of the User Info field, preferably at the end of the subfield.

The proposed format may thus add a like-TRS field 600 on the existing Trigger Dependent User Info field 314.

The dedicated field 600 may be made similar to conventional TRS control subfield 350 as shown in FIG. 3*b*. However, as most of the information (regarding transmission parameters to AP 110) provided by such subfield 350 are already defined in other fields of Trigger frame 510 and may not be relevant for Dil acknowledgment (because AP 110 will not receive the response), the TRS control subfield may be lightened as shown in FIG. 6.

In embodiments, the dedicated field 600, here referred to as S-TRS, is restricted to two subfields and comprises a HE TB PPDU length field and a RU allocation field (according to 802.11ax D3.0) respectively defining a length of the response resource unit (i.e. of response MU transmission 570) and a position of the response resource unit within a frequency band of the MU transmission. In short, only conventional subfields 351 and 352 may be kept.

In specific embodiments, the dedicated field 600 comprises a single subfield, namely only a HE TB PPDU length field defining a length of the response resource unit. The dedicated field 600 is thus restricted to conventional subfield 351, thereby saving bits. This format is particularly suitable when the resource unit used for DiL/DL transmission and the corresponding response resource unit (for acknowledgment/response) have the same RU position within the frequency band. This is the case for instance of FIG. 5: the RU allocation of the response RUs is implicit and corresponds to the RU allocation of the DiL/DL RUs used by the stations to transmit the DiL/DL data in the preceding MU transmission 520.

An advantage of these formats is that the current 802.11ax format can be kept, as only an additional field is added when appropriately signalled.

Indeed, regardless of the format used, retro compatibility of the new format with existing 802.11 devices may be obtained by merely signaling (using a binary flag) when the new format is used. In other words, the response resource unit is jointly signaled, in the trigger frame (more precisely in the corresponding User Info field 310), by the dedicated field 600 and a binary (preferably one bit) flag indicating the presence of the dedicated field. For instance, reserved bit B39 313 of User Info field 310 or reserved bit B5 610 of the basic Trigger Dependent User Info subfield 314 (see FIG. 6) can be used.

Thanks to such signalling, both the source station and the destination station of a DiL transmission can read the S-TRS field 600 and use it respectively to receive and send the response data (e.g. acknowledgment).

Figure 7:
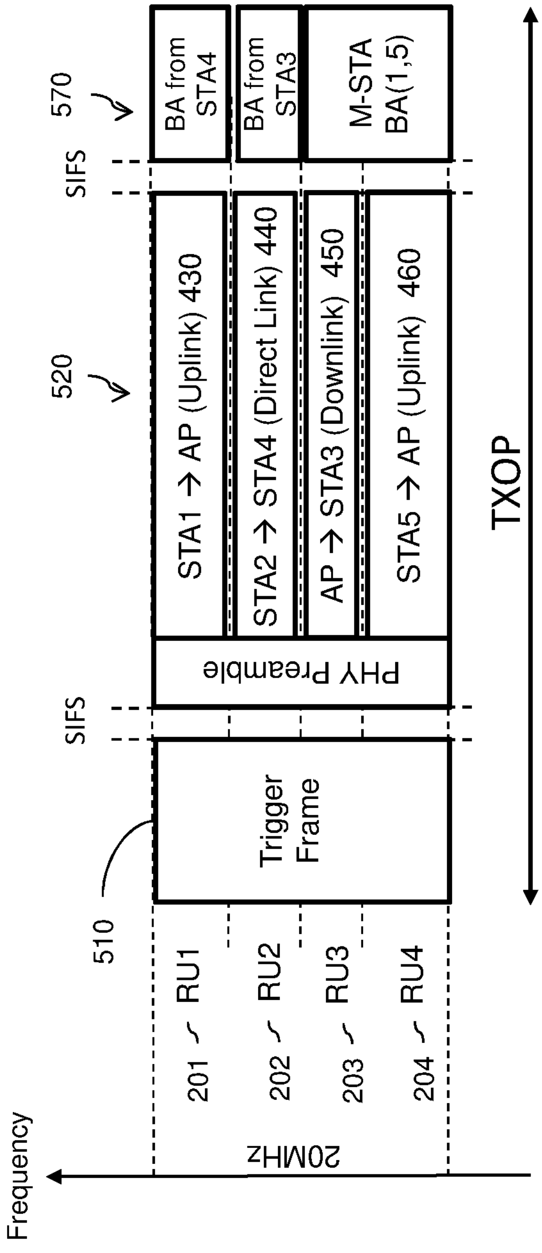
FIG. 7 illustrates a variant of FIG. 5.

FIG. 7 illustrates a variant of FIG. 5, wherein uplink-related response resource units for AP 110 to send responses (usually acknowledgments) to the uplink transmissions (here performed over RU1 and RU4) are grouped over adjacent resource units (here RU3 and RU4). AP 110 may thus perform a M-STA BA over these adjacent response resource units, and let the other response RUs to the destination non-AP stations (STA3 and STA4) for them to send their response.

The response RUs for DiL/DL transmission may thus not have the same RU position as the corresponding DiL/DL RU. Field 352 in the S-TRS subfield 600 provides the exact location/position of the response RU to be used.

By grouping Uplink-related responses on one side and the responses related to other kinds of transmission (Direct link and Downlink) on another side, AP 110 is able to receive and emit response data over two non-overlapping frequency bands. This advantageously limits the number of required antenna at AP 110 and/or the quality of the radio filter dedicated to isolate the frequency bands to use. Also it allows AP 110 to use the Multi Station block ack (M-STA BA) format as described in the 802.11ax amendment, which is more efficient than the conventional block ack (BA) sent separately over each RU.

Figure 8:
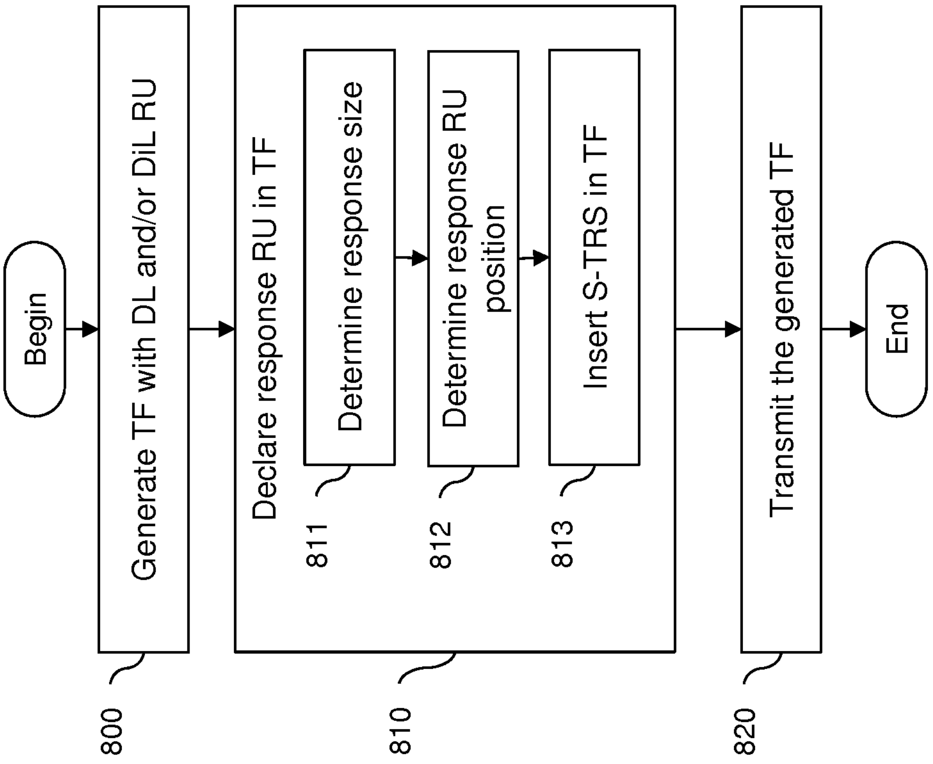
FIGS. 8 and 8*a* illustrate, using flowcharts, operations performed at the triggering station, e.g. the AP, according to various embodiments.

Turning now to the operations made by the triggering station and triggered stations, usually the AP and the non-AP stations respectively, FIG. 8 illustrates, using a flowchart, general steps performed by the triggering (here AP) station.

At step 800, the AP generates a trigger frame 510 to trigger a multi-user, MU, transmission. As introduced above, the trigger frame 510 allocates a first resource unit of the MU transmission for data transmission towards a destination triggered station, usually a destination non-AP station. In particular, AP 110 may declare the DiL/DL RU with the destination non-AP station and, when required (for DiL), the source non-AP station using AID12 subfield 311, reserved bit B39 313 and/or Trigger Dependent User Info subfield 314.

Conventional UL resource units may also be provided by the trigger frame 510 in the MU transmission.

Decision to include such DiL or DL resource unit in the next MU transmission may be based on various criteria at the AP, for instance based on previous Buffer Status Reports received from the non-AP stations or on AP's internal buffer queues. In a variant, a RU (for DL or DiL purpose) may be allocated periodically.

For efficiency purposes, DL RUs and scheduled RUs (i.e. those for which the source station is known) for UL or DiL are preferably declared in the trigger frame before random RUs (source station not known—the stations access to such RUs through contention) for UL or DiL transmissions. This allows a non-AP station to know if it has a RU allocated for it before attempting to contend for access to a random RU either for UL or DiL transmission.

Note the order of RU declaration is the order of corresponding User Info fields 310 in the trigger frame.

At step 810, AP 110 determines whether response RUs are required. This may be the case as soon as at least one DiL/DL RU is provided in the trigger frame 510 at step 800.

In the affirmative, AP 110 determines at step 811 the size it can allocate to each response. The AP can decide not to allocate response size to a DiL/DL RU (depending on the data priority for instance).

If the AP decides to allocate the same length for each response (which is not mandatory but useful for the OFDMA decoding when several sets of response data are intended for the same station from various stations), the size can be determined by the AP by considering the maximum number of the TID (Traffic ID) aggregation limit subfields present in each Trigger Dependant User Info field 314 associated with DiL/DL RUs in the Trigger frame built at step 800.

The TID (Traffic ID) aggregation limit subfield determines the maximum number of different TIDs aggregated by the sending station in the data frames sent over the DiL/DL RU used. This number thus reflects the needs of the destination station receiving on this RU to acknowledge all the received traffics (indeed, the destination station needs to send one acknowledgement per received TID).

In addition, the AP considers its own downlink needs (in term of number of different TID to send to each station). This operation that can only be performed by the AP determines the minimum size of the answer period.

All these information determine a minimum size for the response RUs (for DiL and DL RUs) so that each DiL/DL destination station can acknowledge (respond to) each received traffic.

Of course, the AP (more generally the triggering station sending the trigger frame 510) can allocate more time than the minimum response size mentioned above. This should allow the destination non-AP stations to send, over their response resource unit, data additional to the response data.

Next, at step 812, the AP determines the position of each response RU within the frequency band used, i.e. whether it is RU1, RU2, RU3 or RU4 in the examples of FIGS. 5 and 7.

As mentioned above, the AP may decide the response RU has the same RU position as the associated RU used for DiL/DL transmission. In that case, no determination 812 of the positions is necessary, and signalling of such position (using field 352) can be avoided.

As also mentioned above, the determination of the positions may first try to group the uplink-related response RUs (i.e. those RUs the AP will use to acknowledge UL packets received during MU transmission 520), and then determine the positions in such a way the grouped uplink-related response RUs are allocated adjacent RUs in response MU transmission 570.

Next, at step 813, the AP inserts the S-TRS field 600 duly filled in each User Info field 310 associated to DiL/DL RUs for which the AP provides an opportunity for response. Field 351 comprises the response size computed at step 811 and field 352 comprises the RU position, if any, determined at step 812.

In a variant, where the same response size is provided to each DiL/DL destination station, the response size can advantageously be added only once in trigger frame 510 to save bits, for instance in a Trigger Common Info subfield of the Common Info field 300 (see FIG. 3*a*) as described by the 802.11ax standard. If this variant is combined with the same RU position between a DiL/DL RU and its corresponding response RU, S-TRS field 600 is no longer used: only the response size in the Trigger Common Info subfield is sufficient.

It is possible for the AP to use either of these variants, provided it signals the used one in the trigger frame.

Once trigger frame 510 is updated with S-TRS fields 600, trigger frame 510 is sent by the AP to triggered stations, usually non-AP stations, at step 820.

Figure 8A:
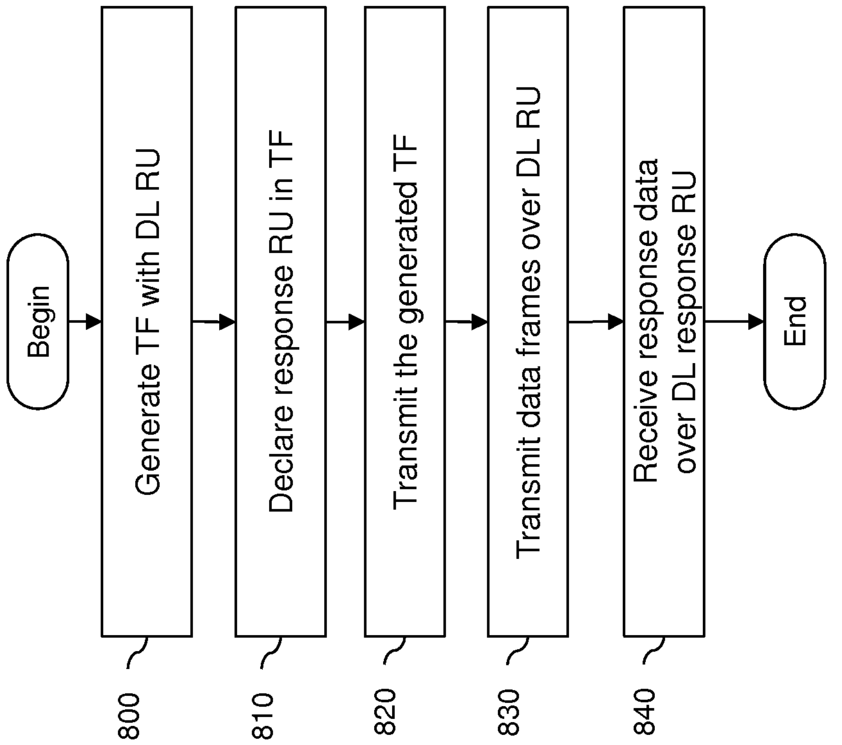

FIG. 8*a* illustrates, using a flowchart, general steps performed by the triggering (here AP) station for DL transmission.

Steps 800-820 remain the same as in FIG. 8, wherein the resource unit is allocated for downlink (DL) transmission from the AP to a destination non-AP station.

Once the RUs have been declared to the stations through trigger frame 510, the AP identifies a DL-allocated RU in the triggered-based MU transmission and uses this DL-allocated resource unit to send a data frame to the destination non-AP station. This is step 830.

Knowing the S-TRS fields 600 associated with the DL-allocated RU used, the AP can listen to the corresponding response RU as declared in trigger frame 510. The AP thus receives response data (e.g. acknowledgment) to the sent data frame, over the response resource unit. In the example of FIG. 7, AP 110 transmits data frame to STA3 over RU3 during MU transmission 520 and, since associated S-TRS field 600 indicates RU2 as corresponding response RU, AP 110 receives the response data (BA) from STA3 over RU2 during response MU transmission 570.

Figure 9:
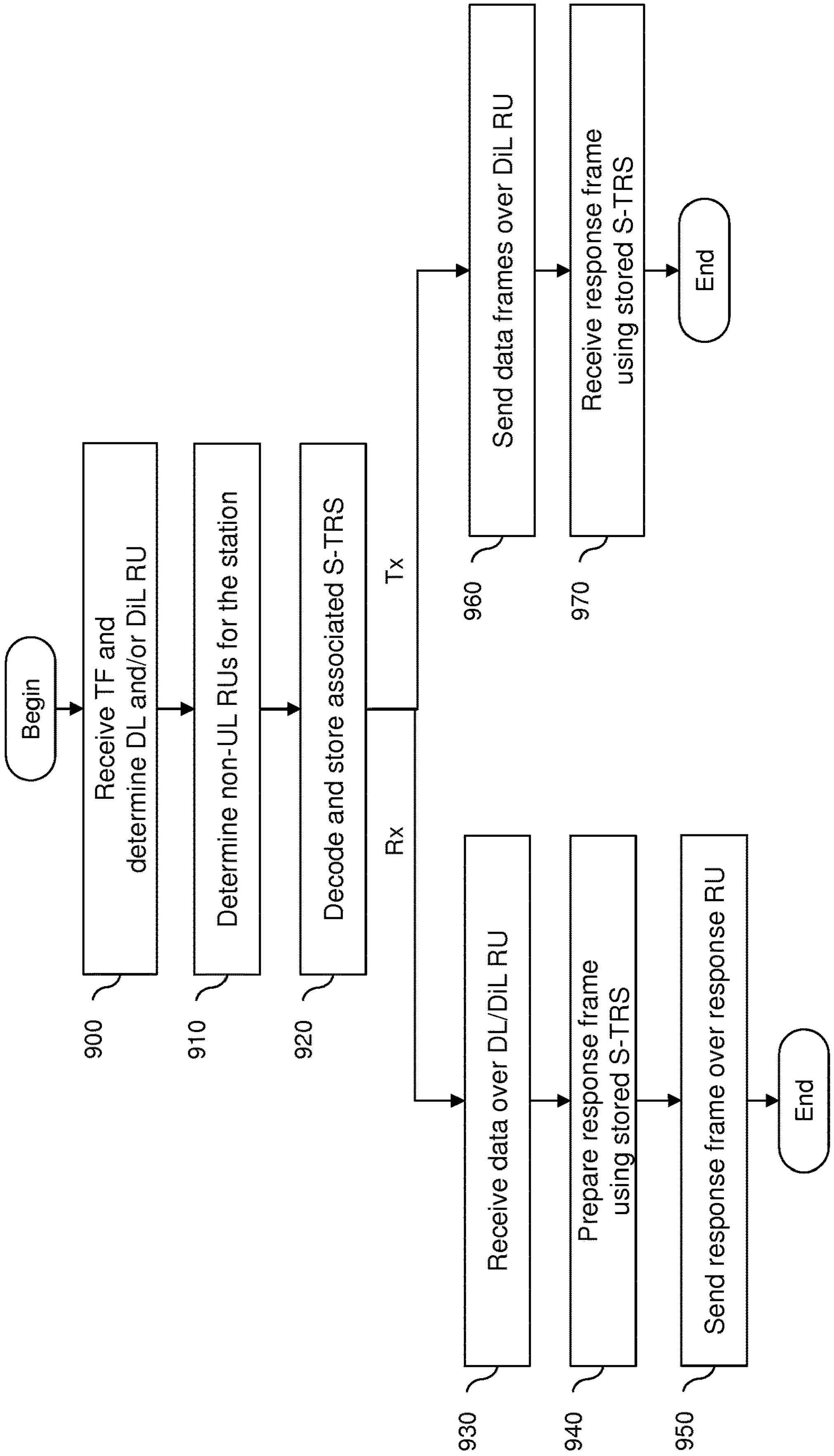
FIG. 9 illustrates, using a flowchart, operations performed at a triggered station, e.g. a non-AP station.

FIG. 9 illustrates, using a flowchart, general steps performed by such a triggered station, here a non-AP station.

At step 900, the non-AP station receives, from a triggering station, usually AP 110, trigger frame 510 triggering a multi-user, MU, transmission, wherein the trigger frame allocates a first resource unit of the MU transmission for data transmission towards the triggered station. The trigger frame also signals a response resource unit of a MU transmission to be used by the triggered station to send a response to the data transmission.

At step 910, the non-AP station decodes the received trigger frame 510, and determines all RUs described in the trigger frame, identifying the non-AP station as a source station or a destination station for a non-UL (i.e. DiL or DL) RU declared in the trigger frame. The case of conventional Scheduled RU for uplink communication is not described here, as it can be handled in a conventional way.

This may be done by analyzing all User Info fields 310 declared in trigger frame 510, and more specifically by analyzing AID12 subfield 311, reserved bit B39 313 and/or Trigger Dependent User Info subfield 314 used by AP 110 to declare the DiL/DL RU with the destination non-AP station and, when required (for DiL), the source non-AP station.

If one or more DiL/DL RUs is determined as intended to the non-station, next step 920 decodes the associated S-TRS field 600 (or the like) and store the S-TRS information (response size and RU position if any) for future usage.

If it is determined at step 910 that the non-AP station is the destination triggered station for a DiL/DL RU, the non-AP station thus receives (step 930) one or more data frames over the determined DiL/DL resource unit. In case of DL transmission, the data frame is received from the triggering station, usually the AP, while in case of DiL transmission, it is received from another triggered (non-AP) station.

At step 930, the non-AP station decodes the data frames received on the DiL/DL RUs using transmission parameters information located in the Use Info field 310 corresponding to these RUs (in case of DL transmission) or using transmission parameters information exchanged with the source non-AP station during a previous direct link session establishment (in case of DiL transmission).

At step 940, the non-AP station recovers the S-TRS information stored at step 920, and prepares the emission of acknowledgement (or any response) accordingly. When preparing the acknowledgment/response frame, the station ensures this frame matches the response size as defined in field 351 (or the like) of the Use Info field 310 corresponding to the DiL/DL RU used. If the length of the acknowledgment/response packet is lower than the response size indicated in the S-TRS information, the non-AP station add padding at the end of the acknowledgment/response packet or add other useful data, in order to exactly match the response size indicated.

Once the acknowledgment/response frame is ready, it is sent over the response RU as identified in field 352 of the Use Info field 310 corresponding to the DiL/DL RU used. This is step 950. In case of DL transmission, the acknowledgment/response frame is sent to the triggering station, usually the AP, while in case of DiL transmission, it is sent to the DiL source triggered (non-AP) station.

To perform step 950, the non-AP station modulates the acknowledgment/response frame according to the RU allocation as indicated in the S-TRS (if DL transmission) or and the modulation used by the source triggered station to transmit the data (if DiL transmission).

In the example of FIG. 7, AP 110 transmits data frame to STA3 over RU3 during MU transmission 520 and, since associated S-TRS field 600 indicates RU2 as corresponding response RU, STA3 sends the response data (BA) to AP 110 over RU2 during response MU transmission 570. Similarly, for DiL transmission, STA2 transmits DiL data frame to STA4 over RU2 during MU transmission 520 and, since associated S-TRS field 600 indicates RU1 as corresponding response RU, STA4 sends the response data (BA) to STA2 over RU1 during response MU transmission 570.

If it is determined at step 910 that the non-AP station is the source triggered station for a DiL RU, the non-AP station thus sends (step 960) a data frame directly to the destination triggered station (as specified in the trigger frame) using the DiL resource unit allocated for direct link transmission. This is step 960.

At step 970, the non-AP station recovers the S-TRS information stored at step 920, and starts listening to the response RU as identified in field 352 of the Use Info field 310 corresponding to the DiL RU used at step 960. It then receives response data to the data frame over the response resource unit. The response data are the acknowledgment/response frame sent by the destination triggered station at its step 950 when performing the process of this Figure.

To perform step 970, the non-AP station may use the modulation and transmission parameters information located in the Use Info field 310 corresponding to these RUs or using exchanged with the destination non-AP station during a previous direct link session establishment.

In the example of FIG. 7, STA2 transmits DiL data frame to STA4 over RU2 during MU transmission 520 and, since associated S-TRS field 600 indicates RU1 as corresponding response RU, STA2 receives the response data (BA) from STA4 over RU1 during response MU transmission 570.

Figure 10B:
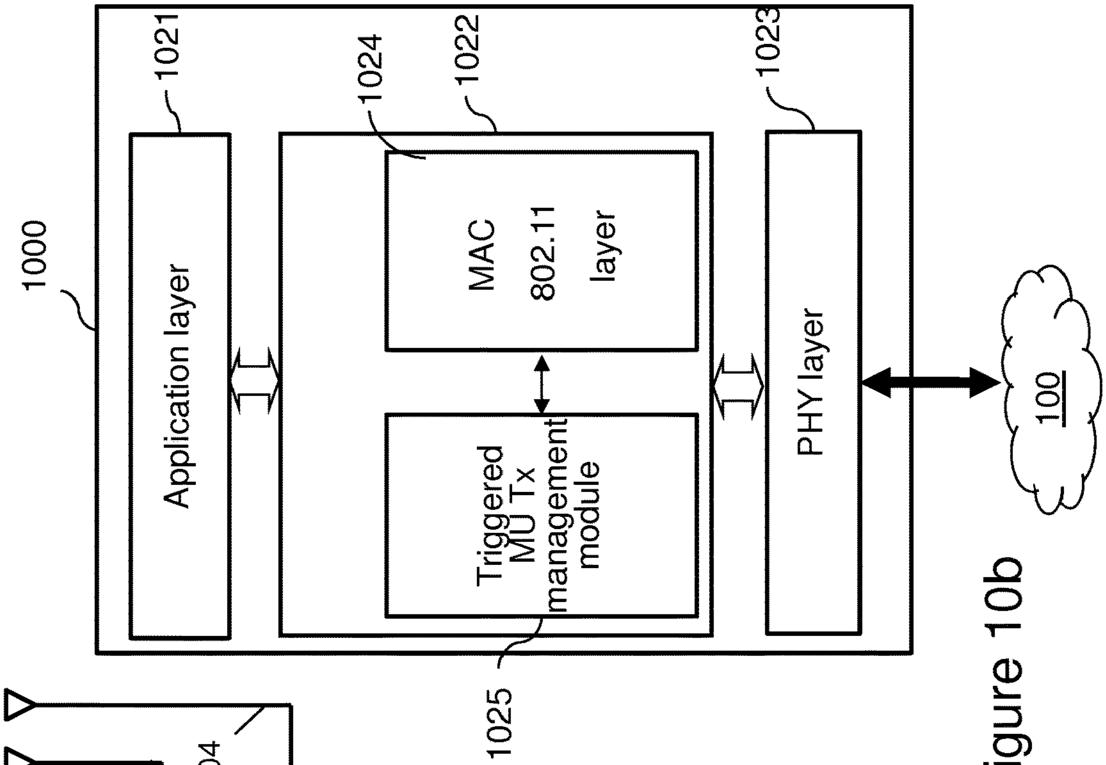
FIG. 10*b* shows a schematic representation of a wireless communication device in accordance with embodiments of the present invention.
Figure 10A:
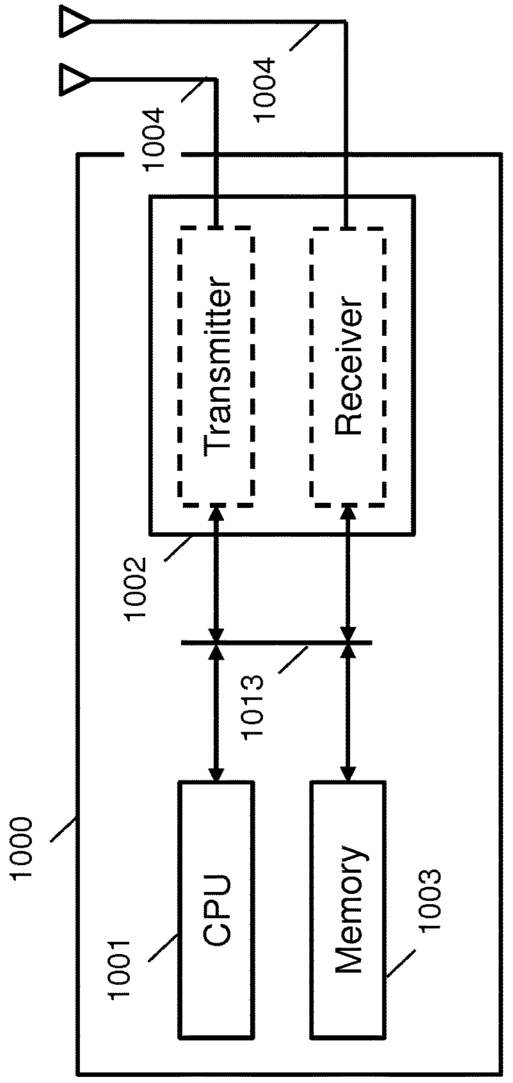
FIG. 10*a* shows a schematic representation a communication device in accordance with embodiments of the present invention.

FIG. 10*a* schematically illustrates a communication device 1000, either a non-AP station 101-107 or the access point 110, of the radio network 100, configured to implement at least one embodiment of the present invention. The communication device 1000 may preferably be a device such as a micro-computer, a workstation or a light portable device. The communication device 1000 comprises a communication bus 1013 to which there are preferably connected:

a central processing unit 1001, such as a processor, denoted CPU;

a memory 1003 for storing an executable code of methods or steps of the methods according to embodiments of the invention as well as the registers adapted to record variables and parameters necessary for implementing the methods; and at least one communication interface 1002 connected to a wireless communication network, for example a communication network according to one of the IEEE 802.11 family of standards, via transmitting and receiving antennas 1004.

Preferably the communication bus provides communication and interoperability between the various elements included in the communication device 1000 or connected to it. The representation of the bus is not limiting and in particular the central processing unit is operable to communicate instructions to any element of the communication device 1000 directly or by means of another element of the communication device 1000.

The executable code may be stored in a memory that may either be read only, a hard disk or on a removable digital medium such as for example a disk. According to an optional variant, the executable code of the programs can be received by means of the communication network, via the interface 1002, in order to be stored in the memory of the communication device 1000 before being executed.

In an embodiment, the device is a programmable apparatus which uses software to implement embodiments of the invention. However, alternatively, embodiments of the present invention may be implemented, totally or in partially, in hardware (for example, in the form of an Application Specific Integrated Circuit or ASIC).

FIG. 10*b* is a block diagram schematically illustrating the architecture of the communication device 1000, either the AP 110 or one of stations 101-107, adapted to carry out, at least partially, the invention. As illustrated, device 1000 comprises a physical (PHY) layer block 1023, a MAC layer block 1022, and an application layer block 1021.

The PHY layer block 1023 (here an 802.11 standardized PHY layer) has the task of formatting, modulating on or demodulating from any 20 MHz channel or the composite channel, and thus sending or receiving frames over the radio medium used 100, such as 802.11 frames, for instance medium access trigger frames TF 410 (FIG. 4) to reserve a transmission slot, MAC data and management frames based on a 20 MHz width to interact with legacy 802.11 stations, as well as of MAC data frames of OFDMA type having smaller width than 20 MHz legacy (typically 2 or 5 MHz) to/from that radio medium.

The MAC layer block or controller 1022 preferably comprises a MAC 802.11 layer 1024 implementing conventional 802.11ax MAC operations, and additional block 1025 for carrying out, at least partially, the invention. The MAC layer block 1022 may optionally be implemented in software, which software is loaded into RAM 1012 and executed by CPU 1011.

Preferably, the additional block 1025, referred to as Triggered MU Tx management module for triggered MU transmissions following a medium access trigger frame through OFDMA resource units (sub-channels), implements the part of embodiments of the invention (either from station perspective or from AP perspective).

For instance and not exhaustively, the operations for the station (AP or non-AP) may include, at the AP, generating and sending a trigger frame allocating a RU for DiL or DL transmission and defining a corresponding response RU, sending data frames to a destination triggered station using a DL RU, receiving response data and at the triggered stations, receiving such a trigger frame, receiving such data frames from the AP over a DL RU, sending data frames to another triggered station over an allocated DiL RU, receiving data frames from another triggered station over an allocated DiL RU, sending over an indicated response RU a response frame in response to received DiL/DL data, receiving over an indicated response RU a response frame in response to DiL/DL data it has previously sent.

MAC 802.11 layer 1024, Triggered MU Tx management module 1025 interact one with the other in order to process accurately communications over OFDMA RU addressed to multiple stations according to embodiments of the invention.

On top of the Figure, application layer block 1021 runs an application that generates and receives data packets, for example data packets such as a video stream. Application layer block 1021 represents all the stack layers above MAC layer according to ISO standardization.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for wireless communication comprising, at a triggering station:

generating a trigger frame to trigger a multi-user (MU) transmission, wherein the trigger frame includes first information for allocating a first resource unit of the MU transmission for data transmission towards a destination triggered station, and sending the trigger frame to the destination triggered station, wherein the trigger frame further includes second information different from the first information, the second information being for specifying a response resource unit of a MU transmission to be used by the destination triggered station to send a response to the data transmission.

2. The method of claim 1, wherein the first resource unit and the response resource unit belong to the same transmission opportunity granted to the triggering station through Enhanced Distributed Channel Access (EDCA) contention.

3. The method of claim 2, wherein the first resource unit and the response resource unit may belong to MU transmissions triggered by the same trigger frame.

4. The method of claim 2, wherein the first resource unit and the response resource unit have the same RU position within a frequency band.

5. The method of claim 2, wherein the trigger frame includes other information for allocating other resource units of the MU transmission for uplink transmissions to the triggering station and for specifying corresponding uplink-related response resource units for the triggering station to send responses to the uplink transmissions, wherein the information for specifying the response resource units groups the uplink-related response resource units over adjacent resource units.

6. The method of claim 2, wherein the response resource unit is specified, in the trigger frame, in a User Info field associated with the first resource unit according to 802.11ax D3.0.

7. The method of claim 6, wherein the information for specifying the response resource unit includes a dedicated subfield in a Trigger Dependent User Info subfield of the User Info field according to 802.11ax D3.0.

8. The method of claim 7, wherein the dedicated subfield comprises a HE TB PPDU length field and a RU allocation field respectively defining a length of the response resource unit and a position of the response resource unit within a frequency band of the MU transmission.

9. The method of claim 7, wherein the dedicated subfield comprises only a HE TB PPDU length field according to 802.11ax D3.0 defining a length of the response resource unit.

10. The method of claim 7, wherein the response resource unit is jointly specified by the dedicated subfield and a binary flag indicating the presence of the dedicated subfield.

11. The method of claim 2, wherein the response data are an acknowledgment of the data or direct link (DiL) transmission.

12. The method of claim 1, wherein the first resource unit is allocated for downlink transmission from the triggering station to the destination triggered station, and the method further comprises, at the triggering station:

sending a data frame to the destination triggered station using the first resource unit allocated for downlink transmission, and receiving response data to the data frame over the response resource unit.

13. A method for wireless communication comprising, at a triggered station:

receiving, from a triggering station, a trigger frame triggering a multi-user (MU) transmission, wherein the trigger frame includes first information for allocating a first resource unit of the MU transmission for data transmission towards the triggered station, wherein the trigger frame further includes second information different from the first information, the second information being for specifying a response resource unit of a MU transmission to be used by the triggered station to send a response to the data transmission, and responsive to receiving a data frame over the first resource unit, sending response data over the response resource unit.

14. The method of claim 13, wherein the triggered station sends, over the response resource unit, a data frame additional to the response data.

15. A method for wireless communication comprising, at a triggered station:

receiving, from a triggering station, a trigger frame triggering a multi-user (MU) transmission, wherein the trigger frame includes first information for allocating a first resource unit of the MU transmission for direct link (DiL) transmission towards a destination triggered station, wherein the trigger frame further includes second information different from the first information, the second information being for specifying a response resource unit of a MU transmission to be used by the destination triggered station to send a response to the DiL transmission, sending a data frame directly to the destination triggered station using the first resource unit, and receiving response data to the data frame over the response resource unit.

16. A station in a wireless network comprising a microprocessor configured for carrying out the steps of:

generating a trigger frame to trigger a multi-user (MU) transmission, wherein the trigger frame includes first information for allocating a first resource unit of the MU transmission for data transmission towards a destination triggered station, and sending the trigger frame to the destination triggered station, wherein the trigger frame further includes second information different from the first information, the second information being for specifying a response resource unit of a MU transmission to be used by the destination triggered station to send a response to the data transmission.

17. A station in a wireless network comprising a microprocessor configured for carrying out the steps of:

receiving, from a triggering station, a trigger frame triggering a multi-user (MU) transmission, wherein the trigger frame includes first information for allocating a first resource unit of the MU transmission for data transmission towards the station, wherein the trigger frame further includes second information different from the first information, the second information being for specifying a response resource unit of a MU transmission to be used by the station to send a response to the data transmission, and responsive to receiving a data frame over the first resource unit, sending response data over the response resource unit.

18. A station in a wireless network comprising a microprocessor configured for carrying out the steps of:

receiving, from a triggering station, a trigger frame triggering a multi-user (MU) transmission, wherein the trigger frame includes first information for allocating a first resource unit of the MU transmission for direct link (DiL) transmission towards a destination triggered station, wherein the trigger frame further includes second information different from the first information, the second information being for specifying a response resource unit of a MU transmission to be used by the destination triggered station to send a response to the DiL transmission, sending a data frame directly to the destination triggered station using the first resource unit, and receiving response data to the data frame over the response resource unit.

* * * * *